United States Patent
Allan et al.

(10) Patent No.: US 7,570,414 B2
(45) Date of Patent: Aug. 4, 2009

(54) MAGNETIC PHOTONIC CRYSTAL STRUCTURE FOR PROVIDING SPATIAL FREQUENCY ASYMMETRY FOR LIGHT PROPAGATING IN DIFFERENT DIRECTIONS

(75) Inventors: Douglas Clippinger Allan, Corning, NY (US); Nicholas Francis Borrelli, Elmira, NY (US); Karl William Koch, III, Elmira, NY (US); John Forrest Wight, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 125 days.

(21) Appl. No.: 11/156,042

(22) Filed: Jun. 17, 2005

(65) Prior Publication Data

US 2006/0109530 A1 May 25, 2006

(51) Int. Cl.
*G02F 1/09* (2006.01)
*G02F 1/03* (2006.01)
*G02F 1/07* (2006.01)
(52) U.S. Cl. ...................... 359/280; 359/252
(58) Field of Classification Search ................. 359/280, 359/248, 252, 298–300, 321, 586, 652–655, 359/241–244; 385/8, 122, 141, 147
See application file for complete search history.

(56) References Cited

U.S. PATENT DOCUMENTS 5,999,308 A * 12/1999 Nelson et al. ............... 359/321
6,350,618 B1    2/2002 Borrelli et al. .............. 436/174
6,671,097 B2 * 12/2003 Fink et al. .................... 359/586
7,106,918 B2 *  9/2006 Bita et al. ....................... 385/6

OTHER PUBLICATIONS

A. Figotin and I. Vitebsky, *Non-reciprocal Magnetic Photonic Crystals*, Phys. Rev. E, vol. 63, 066609 (2001).
I. Vitebsky et al, *Electronic Energy Spectra In Antiferromagnetic Media With Broken Symmetry*, Phys. Rev. B, 55(18), 12,566-12,571 (1997).

* cited by examiner

Primary Examiner—Scott J Sugarman
Assistant Examiner—Brandi N Thomas
(74) Attorney, Agent, or Firm—Gregory V. Bean; Ronald J. Paglierani

(57) ABSTRACT

A magnetic photonic crystal for providing asymmetry of spatial frequencies in the propagation of light is provided. The crystal is formed from at least two materials having different indices of refraction which are aligned along the longitudinal axis of the crystal. And arranged in an array whose symmetry does not include a spatial inversion operator such that (x,y) ==/=(-x,-y). One or more of the materials forming the array is magnetic such that the magnetic group representation of the array does not include time inversion as a symmetric operator. In operation, when the magnetic material forming the material is magnetized, the group velocity property of light propagated in one direction along the axis of the array is different from the group velocity property of light transmitted in an opposite direction through the array. The magnetic photonic crystal may be used, for example, as an optical memory device or a high speed modulator/demodulator.

13 Claims, 2 Drawing Sheets

For the asymmetric honeycomb lattice with $r_1 \Lambda = 0.225$ and $r_2 \Lambda = 0.1$. The diagonal elements of the dielectric tensor are $25=5^2$ and the off diagonal elements are $i16 = i4^2$.

MAGNETIC PHOTONIC CRYSTAL STRUCTURE FOR PROVIDING SPATIAL FREQUENCY ASYMMETRY FOR LIGHT PROPAGATING IN DIFFERENT DIRECTIONS

FIELD OF THE INVENTION

This invention generally concerns photonic crystals, and is specifically concerned with a magnetic photonic crystal structure that provides spatial frequency asymmetry for light propagation in different directions through the crystal.

BACKGROUND

There has been considerable literature over the past ten years pertaining to the properties and possible devices based on photonic crystal structures. In particular, there has been some recognition in the prior art that certain magnetic photonic crystal structures have the potential to create spatial frequency asymmetry for light propagation in different directions through the crystal. Such structures could provide the basis for a whole new class of optical devices. For example, such a crystal structure might be used as an optical memory device where the group velocity property of light propagating in one direction through the crystal is reduced to a near-zero speed upon the application of a magnetic field. Such a crystal structure might also be used for high speed modulation or demodulation of an optical signal, or as an optical routing or switching device.

However, fabrication of the periodic dielectric patterns required for such photonic crystals has proved problematical, especially for 3-D structures. Such periodic dielectric patterns in the crystal structure produces "gaps" in frequency where propagation is forbidden. This effect is readily seen through the use of a frequency vs. propagation constant diagram. (See J. D. Joannopoulos, R. D. Meade, J. N. Winn, *Photonic Crystals—Molding The Flow of Light,*" Princeton University Press, 1995). The specifics of such diagrams depend on the particular geometric pattern of areas having different dielectric constants as well as the relative difference between the constants. In the examples in this application, the required periodic dielectric pattern is achieved by a periodic square array of holes in a dielectric material. By the incorporation of appropriate disruptions of the periodicity, one can create "localized" states within the gaps. These localized states can lead to waveguides, or resonator structures.

In general the frequency vs propagation constant diagram is symmetric such that $\omega(k)=\omega(-k)$. This conclusion can be drawn by following the approach given by Joannopoulas (*Photonic Crystals*, page 36) to establish the time invariance of the energy bands. Using his notation for the Maxwell operator $$\Theta = \nabla x \left( \frac{1}{g(r)} \nabla \right) x \qquad 1)$$

he writes the operator equation $$\Theta H_k = (\omega/c)^2 H_k \qquad 2)$$

Taking the complex conjugate of equation 2 and noting that $\Theta = \Theta^*$, one has $$\Theta H_k^* = (\omega/c)^2 H_k \qquad 3)$$

This shows that $H_k^*$ is also an eigenvector of $\Theta$ with the same eigenvalue as $H_k$. From the Bloch representation of $H_k$ $$H_k = \exp(k \cdot r) u(r) \qquad 4)$$

One sees that $H_k^*$ corresponds to the wave traveling backward with propagation vector $-k$. The conclusion is that since both $H_k$ and $H_k^*$ have the same eigenvalues, then one must conclude that $$\omega(k)=\omega(-k) \qquad 5)$$

The explicit assumption in this derivation is that the dielectric tensor "$\in$" is real. In the above case it is of the simplest form of a scalar. The more general case occurs when there is a magnetic field present, either external, or internal. As an example, consider the situation of an otherwise isotropic medium in a static magnetic field. The dielectric tensor is now of the form (see A. Yariv and P. Yeh, *Optical Waves in Crystals: Propagation and Control of Laser Radiation*, John Wiley & Sons, Hoboken, N.J., 1983)

$$D=\in E+i\gamma BxE \qquad 6)$$

The $\gamma$ for an isotropic material is a scalar, but in the more general case it is a tensor whose form depends on the symmetry of the material. One can arrive at a similar expression for D from a free-energy expansion in E and H.

$$\phi = \in_{ij} E_i E_j + \mu_{ij} H_i H_j + \gamma_{ijk} B_i E_j E_k + \ldots \qquad 7)$$

Here $D=\partial\phi/\partial E$, and $\gamma$ is complex. For the isotropic case, one applies the appropriate symmetry operations to obtain the non-zero elements of $\gamma$.

If one expands equation 6 for the case of a static magnetic field in the z-direction one has the following result $$D_i = \begin{pmatrix} D_x \\ D_y \\ D_z \end{pmatrix} = \begin{pmatrix} \varepsilon & -i\gamma B_z & 0 \\ i\gamma B_z & \varepsilon & 0 \\ 0 & 0 & \varepsilon \end{pmatrix} \begin{pmatrix} E_x \\ E_y \\ E_z \end{pmatrix} = \varepsilon_{ij} E_j \qquad 8)$$

In the case of no external magnetic field, the dielectric tensor is symmetric, but the general condition that is required in the case of no absorption is that it be Hermitian.

$$\in_{ij}=[\in_{ji}^*] \qquad 9)$$

The expression for the dielectric tensor in equation 8 is now the one we will use in the equation 1 for the Maxwell operator. One finds now that although $\Theta$ is still Hermitian, (conjugate transpose) nonetheless $\Theta \neq \Theta^*$. We see that the representation of the time reversal operation with conjugation is the condition that constitutes time reversal in its simplest form.

To consider time reversal in the more general case, and in particular the consequence it may have on spectral asymmetry, one must consider its properties in more detail. It is clear that for the anti-symmetric $\omega(k)=-\omega(-k)$ condition to hold then both time reversal and spatial inversion must not be elements of the symmetry group of the crystal. The situation has been considered for the case of the degeneracy of energy bands in magnetically ordered crystals. Time reversal, in addition to $t \rightarrow -t$, has the effect of reversing the direction of the spin. For crystals exhibiting magnetic ordering (either internal or through an external magnetic field), the symmetry classification has to be expanded to take this condition into account. The fact that the time invariance operator is non-unitary does not allow for a simple representation, as exists for the spatial symmetry operations.

The invention is based on the applicants' recognition that there are 2-D photonic crystal structures with anti-symmetric mode behavior, which largely solves the fabrication problem referred to earlier. A. Figotin and I. Vitebsky, *Non-reciprocal Magnetic Photonic Crystals*, Phys. Rev. E., Vol. 63, 066609 (2001) show some computed examples of spectral asymmetry for the simple 1-D structure. Here he uses alternate layers of magnetic and non-magnetic materials are used to create a dielectric reflector. To have spectral asymmetry in a 1-D structure requires additional anisotropy in the non-magnetic layer. As discussed hereinafter, this condition may be obviated in higher dimensional structures by the inclusion of an appropriate magnetic medium or external field. It should be noted that in this case the time invariance breaking magnetic field is an internal one as provided by the ordered magnetic structure. In the derivation given above, the use of an external field is assumed. This case is more general in that it does not require a ferromagnetic medium. However, from a practical view the degree of spectral asymmetry will depend on the magnitude of the field which in the case of a ferromagnetic material, the internal field, "B" will be quite large.

SUMMARY OF THE INVENTION

Generally speaking, the invention is a medium for providing asymmetry of spatial frequencies in the propagation of electromagnetic radiation such that F(k) does not=/=F(-k), where F is the frequency, and k is the direction of propagation, that comprises at least two materials having different dielectric constants, the two materials being transmissive of the radiation and aligned along a direction of propagation in a two-dimensional periodic array whose symmetry does not include a spatial inversion operator such that (x,y) does not=/=(-x, -y), wherein one or more of the materials forming the array is magnetic. The magnetic group representation of the array must not include time inversion as a symmetry operator.

In the preferred embodiment, at least one of the materials forming the array is selected from the 58 of 122 point group classifications of magnetic materials but do not include time inversion as an included symmetry operation.

When the electromagnetic radiation is light, the two materials are transparent, and have different indices of refraction. In one preferred embodiment, one of the materials is a glass-ceramic composite, while the other material is air, the array being formed from a pattern of holes aligned along a longitudinal axis of the medium.

In operation, when the magnetic material forming the array is magnetized, the group velocity property of light propagated in one direction along the axis of the array is different from the group velocity property of light transmitted in an opposite direction through the array. The spectral asymmetry may be sufficient to change the group velocity property through the medium to a near-zero speed. A potential practical application of the invention would be for use as an optical memory.

INVENTION

Detailed Description of the Preferred Embodiment

Figure 1:
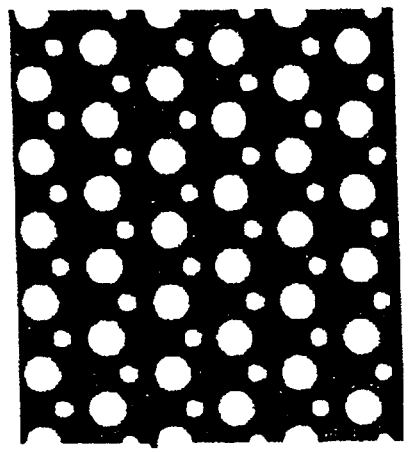
FIG. 1 is a cross-sectional view of a photonic crystal embodying the invention, illustration an asymmetrical two dimensional array of holes in a magnetic medium that forms the crystal.

The utility of having a magnetic photonic crystal structure possessing spectral asymmetry is in the ability to alter the propagation of light by the reversal of a magnetic field (either external or internal) One could imagine being able to change the dispersion and/or the group velocity by changing the direction of the magnetic field.

As previously demonstrated, the presence of a static magnetic field, either external or internal as would exist in a magnetically ordered material, allows the possibility of spectral asymmetry (absence of time invariance): Figotin et al also recognized this condition and proposed that a photonic crystal could supply the required structure to manifest the spectral asymmetry. As discussed above they restricted their analysis to a 1-D case using alternating layers of magnetic and non-magnetic materials. In order for them to calculate the presence of spectral asymmetry they had to add optical anisotropy into the non-magnetic layers.

Applicants invention is the recognition that the dimensionality of the photonic crystal structure is key to the manifestation of spectral asymmetry, and that it is only in the dimension greater than one that one can identify and control the appropriate geometrical configuration to bring it about. In other words, a 1-D stack has only one symmetry operation and that is translational symmetry in the only dimension that exists. What Fogitin et al did, although never explicitly stated, or perhaps ever realized, was to add another dimension to the nominally 1-D stack by incorporating a birefringence in the non-magnetic layer. They showed that if this anisotropy was not present, then no spectral asymmetry resulted. They needed this anisotropy to produce the required symmetry condition, or lack thereof.

From the above discussion we are looking for a magnetic space group from a symmetry group that does not contain time inversion as an element of the group. Of those we are also interested in the ones without spatial inversion. To be specific we are looking for a symmetry group, G, where the following holds.

$$Rk \neq k. \text{ for all } R \in G \qquad 10)$$

The inclusion of time invariance as a symmetry element, increases the number of point group symmetry groups from 32 to 122. They break down into three classes;

a) the original 32 applicable to non-magnetic crystals b) 32 where T is a symmetry element of the group c) 58 where T is not a member of the group, but is in combination with one or more of the other elements of the group, RT.

It is from the last group that we need to choose our 2-D structures since we do not want the time inversion operator to be an explicit member of the point group. As an example consider the modified "honeycomb" structure shown in FIG. 1. The point group symmetry of the unit cell is $C_{3v}$. It has the symmetry operations (E, $2C_3$, $3\sigma$, $3C_2$) With the application of a magnetic field, say along z, the symmetry reduces to $C_3(E,2C_2)$. One takes this to mean that the full point group symmetry is restored by adding the missing elements of the group, but now combined with the time inversion operator, that is the three T$\sigma$ planes and the three $TC_2$ rotations.

(The reduction of the symmetry as a consequence of the magnetic field can be seen by associating with each point a spin sense. In the ferromagnetic case all of the spins would be rotating in the same sense. For the antiferromagnetic case one could have some sort of alteration as long as it lead to a zero moment. If one now applies the symmetry operations of $C_{3v}$, one sees that the spin direction is opposite under the operation of the three mirrors and the three two-fold rotations, but is left the same by the two three-fold rotations, hence the symmetry reduction to $C_3$)

From a consideration of the Brillouin zone for this structure, we have satisfied the requirement that there in no element of group $C_3$ which takes k to −k. This is true for any arbitrary point of the BZ. The next condition that should be met to insure a strong asymmetry follows from I. Vitebsky et al (*Electronic Energy Spectra In Antiferromagnetic Media With Broken Symmetry*, Phys. Rev B, 55(18), 12,566-12,571, 1997) which states that there is some direction of the wave vector for which the following is true.

$$Rk \to k \text{ for some } R \in G \qquad 11)$$

In this case G represents the group $C_3$ and we see that the direction K to M satisfies this condition under the three-fold rotations. The implication is that although all points in the zone satisfy equation 8, one would expect the strongest evidence of spectral asymmetry along the K-M direction.

Figure 2:
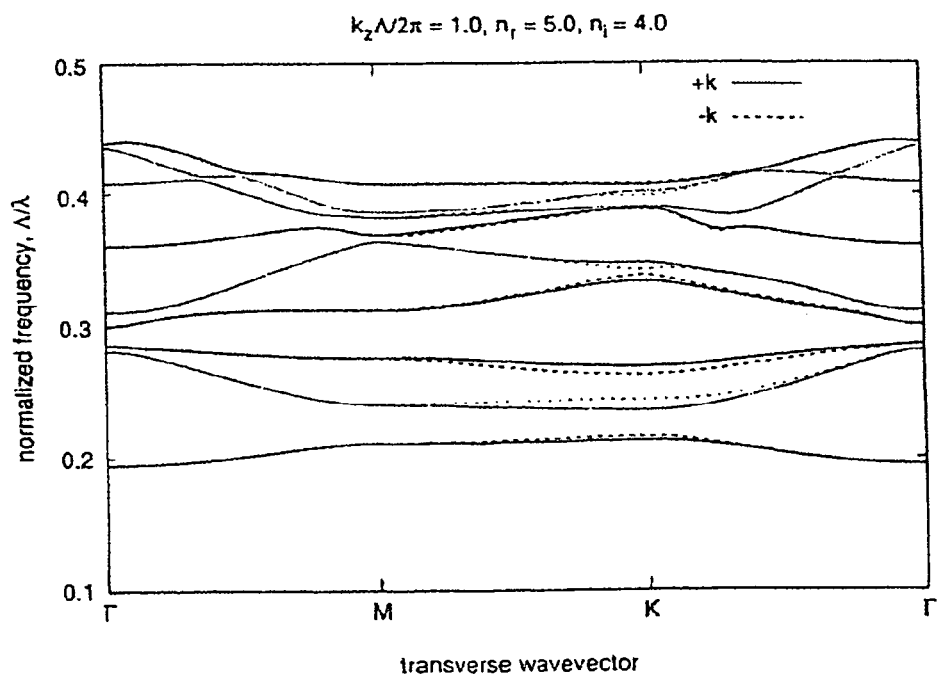
FIG. 2 is a graph illustrating the normalized frequency over the transverse wave vector, which demonstrates how the photonic crystal two dimensional array of FIG. 1 can change group velocity by changing the magnetic field of the crystal.

A calculation of the spectral asymmetry is shown in FIG. 2 for the modified honeycomb structure shown in FIG. 1. FIG. 2 demonstrates that the effect is obtainable.

We have described in a previous patent application the method by which one uses extrusion to produce a photonic crystal pattern using high purity silica as the medium. We propose here to use essentially the extrusion process but now incorporating a magnetic medium. For example, to make ferromagnetic Celcor, either ferromagnetic particles or precursor particles are required, examples of which are strontium ferrite powder (Fermag Tech. UHE-10) and 929CG frit powder respectively. These powders are processed into a paste and Celcor extruded in a manner similar to that described in U.S. Pat. No. 6,350,618, but the recipes must be adjusted for equivalent volume. The strontium ferrite dry-green Celcor can be used as is, or can be impregnated with additional binders to increase its mechanical strength. If the dry-green Celcor is of a sinterable composition, it can be fired to further develop its properties. In the case of the glass frit, it can be sintered and hotdrawn and devitrified to develop the ferrite phase. The viscous processing steps are expected to be similar to U.S. Pat. No. 6,350,618, but the schedules must be adjusted to give equivalent viscosity. The ferromagnetic Celcor can be poled in the wet-green or dry-green or fired state.

Another example would be to use a ferromagnetic glass-ceramic. A representative glass composition is 929 OGW in % wt.

38 $B_2O_3$
12 $Al_2O_3$
16 $Fe_2O_3$
25 BaO
7 CoO

The nature of the medium would allow redraw to reduce the overall dimension to that suitable for the wavelength region of interest, from microwave to telecom.

Figure 3:
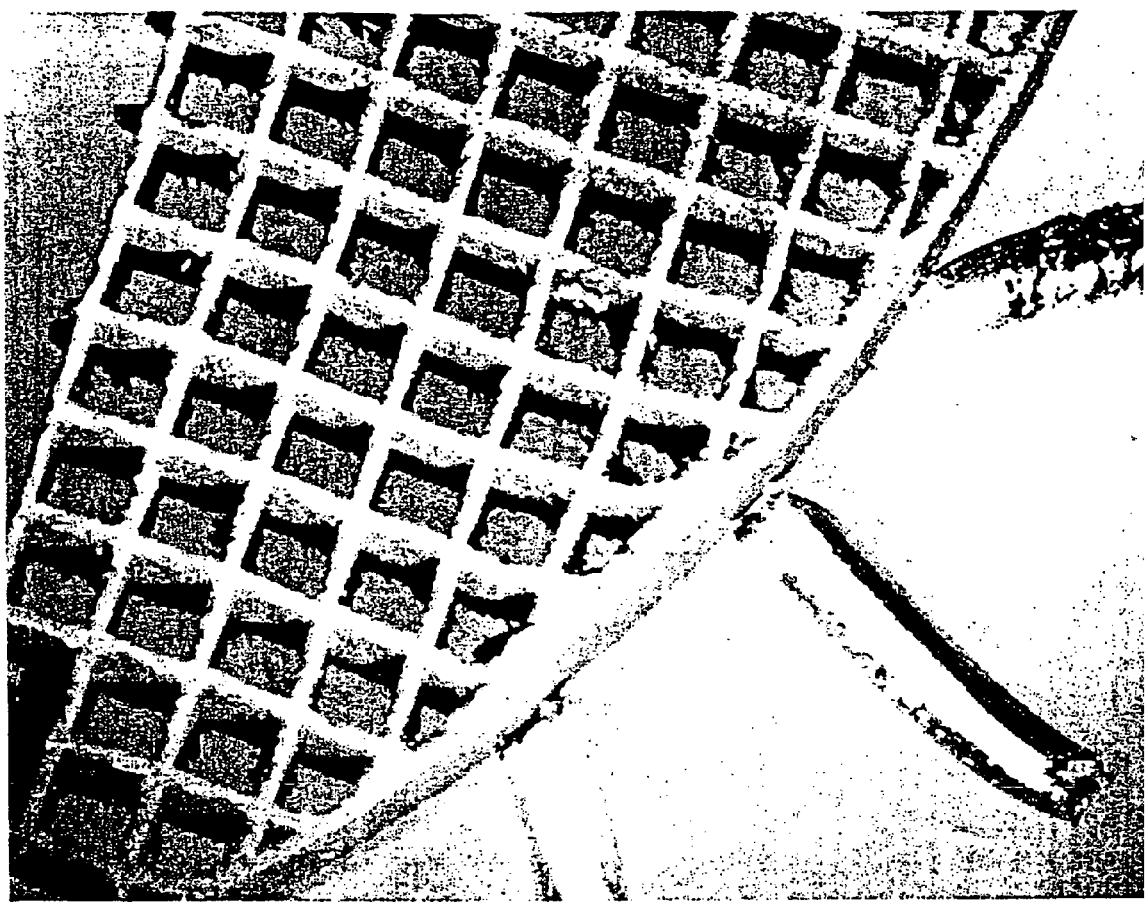
FIG. 3 is a microphotograph of a two-dimensional array in a magnetic photonic crystal fabricated in conformance with the invention.

The extrusion method through the versatility of the die design, allows us to pick from a variety of photonic crystal symmetries. As indicated above, although time invariance breaking is possible in magnetic structures, it is not true for all structures and all materials. Thus the ability to produce a wide variety of geometric patterns from a variety of magnetic phases within the glass-ceramic will be important. We show an example of an extruded magnetic structure in FIG. 3. The extruded structure was magnetized in an external field and now has a net magnetic moment as shown by the attraction of the metal tips.

What is claimed is:

1. A medium for providing asymmetry of spatial frequencies in the propagation of electromagnetic radiation such that $F(k) \ne F(-k)$, where F is the frequency and k is the direction of propagation of the radiation, comprising:
   at least two materials having different dielectric constants, said two materials being transmissive of said radiator and aligned along a direction of propagation in a two dimensional periodic array whose symmetry does not include a spatial inversion operator such that $(x, y) \ne (-x, -y)$,
   wherein one or more of the materials forming said array is magnetic such that the magnetic group representation of the array does not include time inversion as a symmetry operator.

2. The medium defined in claim 1, wherein at least one of the materials forming the array is selected from the point group classifications of magnetic materials that do not include time inversion as an included symmetry operation.

3. The medium defined in claim 1, wherein said beam of electromagnetic radiation is light, and said two materials have different indices of refraction.

4. The medium defined in claim 2, wherein said two materials are transparent.

5. The medium defined in claim 3, wherein one of said materials is a glass-ceramic composite.

6. The medium defined in claim 3, wherein one of said materials is a gas.

7. The medium defined in claim 5, wherein said gaseous material is air.

8. The medium defined in claim 3, wherein one of the materials is a vacuum.

9. The medium defined in claim 3, wherein said two materials are a magnetic glass-ceramic composite and air, respectively.

10. The medium defined in claim 8, wherein said periodic array is formed by a pattern of air-filled openings in said magnetic glass-ceramic composite.

11. The medium defined in claim 2, wherein said spectral asymmetry is sufficient to change the group velocity property of light through said medium to a near-zero speed.

12. The medium defined in claim 1, wherein said medium is a magnetic photonic crystal having air holes through its core and being formed from a magnetic ceramic composite selected from 58 of 122 point group classifications of magnetic materials which do not include time inversion as an included symmetry operator, said air holes forming said two-dimensional periodic array having no spatial inversion symmetry across a cross-section of said crystal transverse to a direction of propagation of said light.

13. The medium defined in claim 1, comprising an extruded magnetic material having air holes along an axis forming said array.

* * * * *